United States Patent [19]

Gaughan et al.

[11] Patent Number: 4,783,124
[45] Date of Patent: Nov. 8, 1988

[54] FREIGHT BRAKE CONTROL VALVE DEVICE HAVING IMPROVED QUICK SERVICE FUNCTION

[75] Inventors: Edward W. Gaughan, Irwin; Theodore B. Hill, North Versailles, both of Pa.

[73] Assignee: American Standard Inc., Wilmerding, Pa.

[21] Appl. No.: 116,941

[22] Filed: Nov. 5, 1987

[51] Int. Cl.⁴ ............................................. B60T 15/30
[52] U.S. Cl. ........................................ 303/37; 303/41; 303/44
[58] Field of Search ................ 303/33, 37, 41, 44, 303/45, 7, 9

[56] References Cited

U.S. PATENT DOCUMENTS 2,033,461  3/1936  Farmer ................................. 303/37
2,055,967  9/1936  Campbell ........................... 303/41

OTHER PUBLICATIONS

"AB" Single Capacity Freight Car Air Brake Equipment with the ABD Control Valve, Sep. 1979.

"AB" Single Capacity Freight Car Air Brake Equipment with the ABDW Control Valve.

Primary Examiner—Andres Kashnikow
Assistant Examiner—Matthew C. Graham
Attorney, Agent, or Firm—G. J. Falce

[57] ABSTRACT

A freight brake control valve device having an improved quick service function achieved by providing an additional volume upstream of the quick service limiting valve with which the brake pipe fluid under pressure is equalized during the second stage of quick service to achieve an intensified secondary quick service reduction of brake pipe pressure. Further, a smooth and continuous local reduction of brake pipe pressure occurs without any time lag at the time of transition from preliminary to secondary stage quick service. In a first embodiment of the invention, an exhaust passage separate from the brake cylinder exhaust passage is provided to assure venting of this additional volume in the event the brake cylinder retainer valve is set up. In a second embodiment, the additional volume is vented via the brake cylinder exhaust passage.

5 Claims, 2 Drawing Sheets

FREIGHT BRAKE CONTROL VALVE DEVICE HAVING IMPROVED QUICK SERVICE FUNCTION

BACKGROUND OF THE INVENTION

The present invention is related to railway car freight brake control valve devices and particularly to the quick service function provided by these control valve devices for effecting a local venting of the train brake pipe air at each car in order to propagate the brake pipe pressure reduction through the train when a brake application is initiated.

Quick service venting of brake pipe pressure is achieved, as a two-stage operation, in the present standard ABD and ABDW freight brake control valve devices. During the first stage, known as preliminary quick service, initial movement of the service piston slide valve from release position toward service position, in response to a train line reduction of brake pipe pressure, establishes a communication between the car brake pipe and a quick service bulb or volume that is, in turn, vented to atmosphere via a quick service exhaust choke. A local reduction of brake pipe pressure is effected by this communication to supplement the train line reduction of brake pipe pressure at each car, thereby serially transmitting the brake application signal from one car to the next car. In addition, this local reduction of brake pipe pressure encourages continued movement of the service piston to service position without hesitation, wherein the second stage of quick service is realized.

During this secondary stage of quick service, the service piston slide valve cuts off brake pipe pressure from the quick service bulb and connects the brake pipe pressure to the car brake cylinder device via the piston valve stem of the quick service limiting valve until approximately 10-12 psi brake cylinder pressure is developed. With the service piston in service position, it will be appreciated that auxiliary reservoir pressure is also connected to the car brake cylinder device concurrently with the brake pipe pressure during this secondary stage of quick service.

It has been found that, due to the relatively high pressure differential between brake pipe and auxiliary reservoir created by the first stage quick service reduction of brake pipe pressure, the degree of service piston movement into service position is such that maximum flow capacity is established at the service piston graduating valve port connecting auxiliary reservoir pressure to the brake cylinder device. The flow capacity of auxiliary reservoir pressure via this port opening momentarily exceeds the downstream flow capacity to the brake cylinder, thereby creating a short term back pressure surge or pressure pulse in the brake cylinder feedback passage to the quick service limiting valve device. Consequently, the brake cylinder pressure signal at the quick service limiting valve control piston reaches the cut-off value of 10-12 psi before the actual brake cylinder pressure builds up this value. Accordingly, the quick service limiting valve is operated to interrupt the connection of brake pipe pressure to the brake cylinder device prematurely, and following dissipation of the back pressure pulse, re-establishes the brake pipe connection to the brake cylinder device.

Ideally, a smooth and continuous transition of the local quick service brake pipe pressure reduction should occur between the first stage preliminary quick service activity and the secondary stage of quick service. Due, at least in part, to this premature operation of the quick service limiting valve, however, a disruption occurs in the local quick service reduction of brake pipe pressure during the transition between the preliminary and secondary stages of quick service. This disruption is indicated by a time lag C, in the graph of FIG. 1, wherein curve A represents the secondary quick service reduction of brake pipe pressure achieved in accordance with the present invention and curve B represents the secondary quick service reduction of brake pipe pressure achieved in the standard ABD and ABDW control valve devices. As can be seen from this graph, during the secondary stage of quick service, curve B is displaced with respect to a curve D representing the brake pipe pressure reduction during preliminary quick service, so that within time period C, no local reduction of brake pipe pressure occurs.

OBJECTS OF THE INVENTION

It is, therefore, the object of the present invention to provide a freight brake control valve device having an improved quick service function.

A further object of the invention is to decrease the time required to achieve a given reduction of brake pipe pressure by intensifying the second stage of quick service activity.

A still further object of the invention is to assure a local reduction of brake pipe pressure during the second stage of quick service irrespective of premature closure of the quick service limiting valve and/or retainer valve operation.

Briefly, the foregoing objectives are achieved in the present invention by providing a secondary quick service bulb or volume in the brake pipe passage between the service piston slide valve and quick service limiting valve to provide a quick service reduction of brake pipe pressure during such time as the quick service limiting valve device is prematurely actuated to cut-off position due to the momentary pressure surge experienced during transition from preliminary quick service to secondary quick service, as the service piston moves from release to service position. During brake release, the secondary quick service bulb is vented either via the brake cylinder exhaust passage or via a separate exhaust passage.

The foregoing objects and other advantages of the invention will become apparent from the following more detailed explanation when taken in conjunction with the accompanying drawings in which.

DESCRIPTION AND OPERATION

Figure 2:
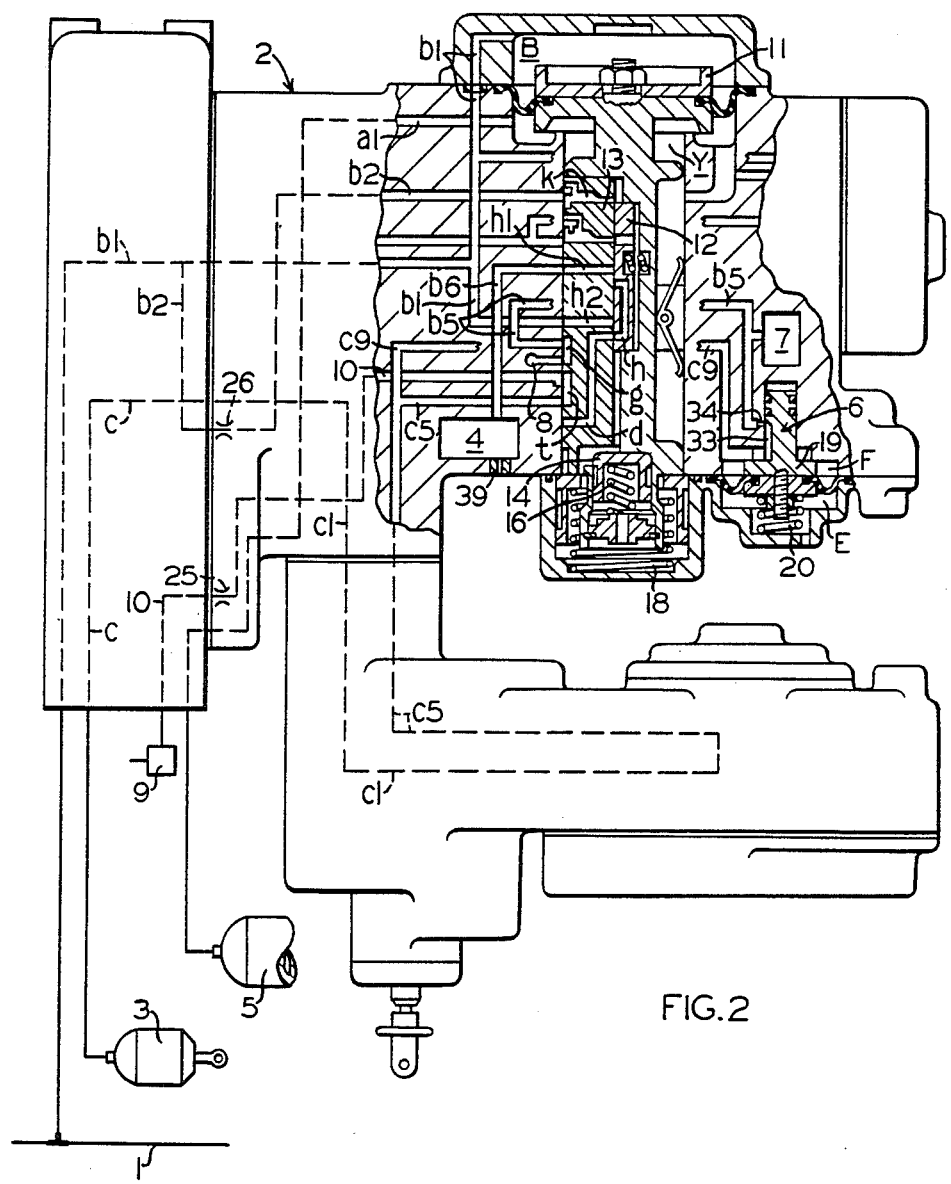
FIG. 2 is a fragmentary diagrammatic view of an ABD/ABDW control valve service portion shown in release position and modified according to one embodiment of the present invention.

In the embodiment of FIG. 2, there is shown a service portion 2 of a freight brake control valve device of the ABD/ABDW type. As is well known to those skilled in the railway braking art, service portion 2 includes a service piston 11 having a slide valve 13 and a graduating valve 12 that cooperate to control the supply, lap, and exhaust of air pressure effective at the brake cylinder device(s) 3 of a railway vehicle freight car, in accordance with pressure variation of the compressed air carried in the car brake pipe 1. Service portion 2 also includes a preliminary quick service bulb or volume 4, a quick service limiting valve 6, and a secondary quick service bulb or volume 7.

In the release position shown, the compressed air carried in brake pipe 1 is connected via passage b1 to chamber B on the face of the service diaphragm piston 11 and to the service slide valve seat. The brake pipe air is also connected via a charging choke 26 and passage b2 to the slide valve seat, from where a choked orifice k in the slide valve communicates with passage b2 to charge a chamber Y on the underside of service piston 11. A passage a1 is connected from chamber Y to the auxiliary reservoir 5, which is thus charged to the pressure carried in brake pipe 1. With brake pipe pressure effective in chamber B and auxiliary reservoir pressure effective in chamber Y charged to the same pressure, a spring 18 establishes release position of service piston 11, in which brake cylinder device(s) 3 is connected to atmosphere via passages C, C1, C5, slide valve port t, exhaust passage 10, exhaust choke 25, and retainer valve 9. A slide valve port g connects the secondary quick service volume 7 to atmosphere via passage b5 and another exhaust passage 8.

With the brake equipment charged to brake pipe pressure as previously described, a service brake application is made at the brake valve by reducing the brake pipe pressure at a controlled rate.

Brake pipe pressure in chamber B on the face of the service diaphragm piston 11 is thus reduced and the pressure in chamber Y deflects the diaphragm piston 11, moving it and the graduating valve 12 upward. The auxiliary reservoir charging choke 26 creates the foregoing differential by preventing auxiliary reservoir air in chamber Y below the service diaphragm piston from flowing back into brake pipe as fast as the brake pipe is reducing in chamber B above the service diaphragm piston.

The stabilizing spring guide 14 engages the end of the service slide valve 13 and further movement of the diaphragm piston and graduating valve 12 toward service position compresses the stabilizing spring 16. As its name indicates, the stabilizing spring offers a predetermined resistance to diaphragm piston and graduating valve movement so that undesired quick service applications will not be caused by small fluctuations in brake pipe pressure. During this initial diaphragm piston movement, the attached service graduating valve 12 blanks port k in the slide valve, cutting off chamber Y and auxiliary reservoir from brake pipe charging passage b2. It also uncovers port d in the slide valve 13 connecting auxiliary reservoir air to the slide valve seat. After the stabilizing spring is compressed, cavity h in the graduating valve connects ports h1 and h2 through the slide valve, permitting brake pipe air to flow from passage b1 to passage b6 and the preliminary quick service volume 4. This produces a local reduction of brake pipe pressure by allowing brake pipe air to flow into the preliminary quick service volume. The reduction is transmitted in rapid wave action serially from car to car; each ABD/ABDW control valve in turn acts in repeater sequence to the adjacent valve to develop prompt starting of brake application on all cars in the train.

The preliminary quick service volume 4 is permanently connected to atmosphere through a quick service exhaust choke 39. By this means, a brake pipe pressure buildup develops in the preliminary quick service volume. This local reduction of brake pipe pressure continues until sufficient pressure differential develops across the service diaphragm piston to move the service slide valve to service position.

As the service piston moves upwardly to service position, the service slide valve is moved upwardly on its seat, port h2 moving out of registry with port b1 and cutting off flow of brake pipe air from passage b1 to passage b6, thereby terminating the preliminary quick service activity. The preliminary quick service volume pressure is subsequently dissipated through exhaust choke 39.

In service position, of service piston 11, cavity d in slide valve 13 registers with passage c5 at the slide valve seat, connecting auxiliary reservoir air to brake cylinder device(s) 3 via passages c5, c1 and c. The air in passage c5 is also connected to a feedback passage c9 leading to chamber F of the quick service limiting valve 6. The force of this air acting on the upper side of the quick service limiting valve control piston 19 acts against the force exerted by bias spring 20 to actuate the control piston when approximately 10-12 psi brake cylinder pressure develops. At the same time, slide valve port g moves out of registry with exhaust passage 8 and registers passage b1 with passage b5. Prior to actuation of control piston 19, brake pipe air in passage b1 is thus connected via slide valve port g and passage b5 to a groove 33 in the stem of control piston 19, which is registered with chamber F and feedback passage c9 to feed brake pipe pressure to brake cylinder device(s) 3 during secondary quick service. Due to the relatively large pressure differential created between the brake pipe and auxiliary reservoir pressures acting across service piston 11, as a result of the preliminary quick service activity, however, the service piston is positioned to establish full registry of slide valve port d with passage c5, thereby providing a rapid influx of air from auxiliary reservoir 5 to the brake cylinder supply passages, the flow capacity of which is restricted by chokes (not shown) in these passages c1 and c downstream of the slide valve. Consequently, a momentary back pressure surge is developed in feedback passage c9, which is reflected at chamber F of the quick service limiting valve 6. This back pressure surge causes a false brake cylinder pressure signal to be effective in chamber F in the form of a momentary high amplitude pressure surge or pulse that exceeds the opposing bias force exerted by spring 20. Consequently, piston 19 can be prematurely and inappropriately actuated to its cut-off position in which the secondary quick service flow of brake pipe pressure to brake cylinder(s) 3 via groove 33 in the piston stem is interrupted. Since secondary quick service volume 7 is located upstream of the quick service limiting valve, however, a local reduction of brake pipe pressure is assured by equalization into the previously vented secondary quick service volume 7 to provide an initial phase of the secondary quick service reduction of brake pipe pressure, as represented by curve A' in the graph of FIG. 1.

Figure 1:
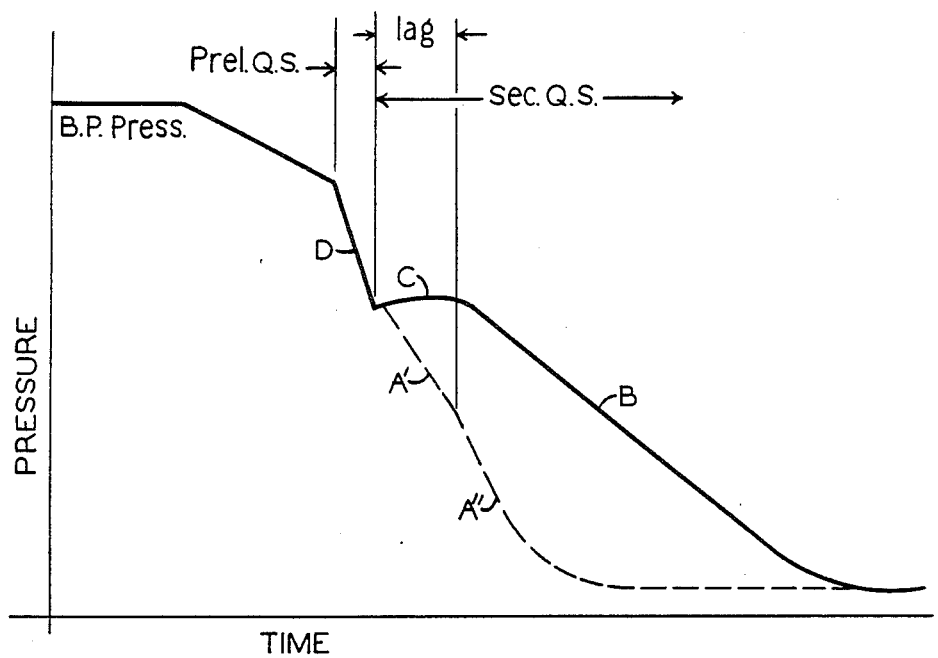
FIG. 1 is a graph showing the quick service brake pipe pressure reduction curve obtained with the present standard ABD and ABDW type freight brake control valve devices and a brake pipe pressure reduction curve achieved in accordance with the present invention.

It will be appreciated, therefore, that during the brief time period that quick service limiting valve 6 may be prematurely actuated due to the momentary pressure surge during the transition between preliminary and secondary quick service, as previously discussed, this connection of brake pipe air to secondary quick service volume 7 will provide a continuing local reduction of brake pipe pressure without any substantial interruption, thereby substantially eliminating the time lag noted at c in the graph of FIG. 1.

Following dissipation of the momentary false back pressure signal or pressure pulse effective in chamber F, spring 20 will become effective to reset control piston 19 and reestablish quick service flow of brake pipe pressure to brake cylinder(s) 3 until the brake cylinder pressure effective in chamber F builds up to 10-12 psi.

During this final phase of secondary quick service, as represented by curve A" in the graph of FIG. 1, limiting valve 6 is effective to reestablish flow of brake pipe pressure to brake cylinder(s) 3 in conjunction with the continuing flow of brake pipe pressure to volume 7. In this manner, an intensified secondary quick service function is achieved, in which the local rate of brake pipe pressure reduction, as represented by the slope of curve A', A" in FIG. 1, is greater than the secondary stage quick service reduction of brake pipe pressure generated in the standard ABD/ABDW control valve device, as represented by the slope of curve B. Curve A', A" is not only steeper than curve B, but also occurs without any significant hesitation or time lag, thus producing a faster propagation of the trainline brake pipe pressure reduction and accordingly a faster response of the train brakes.

When this pressure in chamber F and brake cylinder device(s) 3 is sufficient to overcome the bias force exerted by spring 20, control piston 19 will be appropriately actuated downwardly to a cut-off position in which groove 34 in the stem of control piston 19 isolates passage b5 from chamber F and passage c9 to terminate the second stage of quick service activity. In this manner, a minimum brake cylinder pressure of approximately 10-12 psi is assured in response to a brake pipe pressure reduction.

Upon subsequently increasing brake pipe pressure to effect a brake release in the usual, well-known manner, service piston 11 assumes its release position, as shown, in which slide valve port t establishes communication between brake cylinder passage c5 and exhaust passage 10 to release the brake cylinder pressure via retainer valve 9. At the same time, slide valve port g connects passage b5 with the secondary quick service exhaust passage 8. This provides an alternate exhaust path via which passage b5 and the secondary quick service volume 7 are vented during each brake release, in the event quick service limiting valve 6 is unable to reset due to retainer valve 9 being set to retain brake cylinder pressure at a high enough value to overcome spring 20. This assures that, even though the quick service limiting valve piston 19 is unable to reset, the secondary quick service volume will be vented via the secondary quick service exhaust passage 8 each time a brake application is released to assure secondary quick service activity during a subsequent brake application, by equalization of brake pipe pressure with the previously vented secondary quick service volume 7. In this manner, a brake assurance feature is provided when employing retainer valves.

Figure 3:
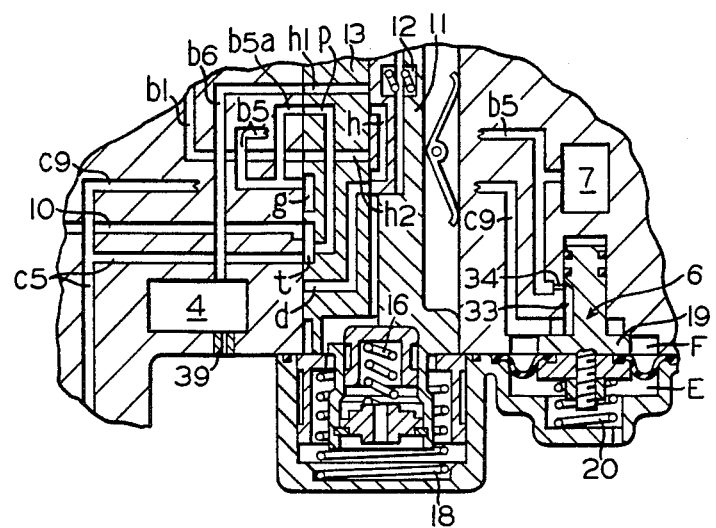
FIG. 3 is a fragmentary diagrammatic view of an ABD/ABDW type control valve service portion shown in release position and modified according to another embodiment of the present invention.

The embodiment of the invention shown in FIG. 3 differs from the FIG. 2 embodiment only in that secondary quick service volume 7 is vented to atmosphere via the brake cylinder exhaust passage 10, instead of via the separate exhaust passage 8 of FIG. 2. This is achieved by connecting a branch passage b5a of passage b5 in the service portion body 2 to the face of slide valve 13 and adding a passage p of port t that registers with passage b5a in release position of service piston 11.

The preliminary and secondary quick service functions are achieved in the same manner as disclosed in the embodiment of FIG. 1. It will be appreciated that, upon movement of service piston 11 from preliminary quick service position to service application position, in which position secondary quick service is achieved, slide valve passage p moves out of registry with passage b5a, thereby cutting off the exhaust connection of the secondary quick service volume prior to the secondary quick service connection of passages b1 and b5 being established via port g. Accordingly, brake pipe pressure is connected to secondary quick service volume 7 to effect a local quick service reduction of brake pipe pressure, in addition to the local quick service reduction of brake pipe pressure via the quick service limiting valve 6. In this manner, an intensified secondary quick service function is achieved, in which the rate of local brake pipe pressure reduction, as represented by the slope of curve A', A" of FIG. 1, approaches the rate of brake pipe pressure reduction achieved during preliminary quick service.

Moreover, in the event quick service limiting valve 6 is inappropriately actuated due to the momentary pressure surge during transition between preliminary and secondary quick service, as previously discussed, this connection of brake pipe air to secondary quick service volume 7 will provide a continuing local reduction of brake pipe pressure without any significant interruption, thereby substantially eliminating the lag noted at C in the graph of FIG. 1. In accordance with the present invention, therefore, relative to the embodiment of FIG. 3, curve A', A" will not only be steeper than curve B, but will occur with substantially no hesitation or time lag, thus producing a faster propagation of the trainline brake pipe pressure reduction and accordingly a faster response of the train brakes.

Upon releasing the brake application, movement of service piston 11 to release position locates slide valve 13 such that slide valve port g is out of registry with passage b1, port t establishes registry with exhaust passage 10, and passage p of port t is registered with passage b5a. This assures that, in the event retainer valve 6 is set up in the pressure retention position, so as to retain 20 psi brake cylinder pressure, for example, and thus prevent quick service limiting valve 6 from resetting, the pressure in secondary quick service volume 7 will be exhausted via passage b5, passage b5a, slide valve passage p and port t, and exhaust passage 10. While the pressure in volume 7 will only be exhausted to the pressure set by retainer valve 6, sufficient pressure differential between the trapped pressure in volume 7 and the effective brake pipe pressure, (particularly following a minimum service brake application) will exist to assure secondary quick service activity on a subsequent brake application, thereby providing a brake assurance feature when employing retainer valves.

We claim:

1. For controlling the brakes on a railway car having a brake pipe normally charged with fluid at a certain chosen pressure, an auxiliary reservoir charged with fluid under pressure from said brake pipe, and a fluid pressure actuated brake cylinder device, there is provided a brake control valve device comprising:
   (a) a service piston abutment subject opposingly to said brake pipe fluid under pressure and said auxiliary reservoir fluid under pressure;
   (b) a supply passage connected to said brake cylinder device;
   (c) a preliminary quick service volume;
   (d) a secondary quick service volume;
   (e) valve means carried by said service piston abutment for establishing a preliminary quick service connection of fluid pressure from said brake pipe to said preliminary quick service volume during initial movement of said service piston from a release position to a service position in response to a reduction of said brake pipe fluid under pressure relative to said auxiliary reservoir fluid under pressure, and during subsequent movement, cutting off said preliminary quick service connection, while concurrently establishing a service connection of said auxiliary reservoir fluid under pressure to said supply passage, and a secondary quick service connection of said brake pipe fluid under pressure to said supply passage and to said secondary quick service volume; and
   (f) quick service limiting valve means downstream of said secondary quick service volume operative in response to said brake cylinder fluid under pressure effective in said supply passage exceeding a first predetermined value for interrupting flow of said brake pipe fluid under pressure to said supply passage via said secondary quick service connection.

2. A brake control valve device as recited in claim 1, further comprising:
   (a) a first exhaust passage via which said supply passage is vented to atmosphere in said release position of said service valve to release fluid under pressure from said brake cylinder device;
   (b) retainer valve means in said exhaust passage for preventing said brake cylinder fluid under pressure from exhausting to a value less than a second predetermined value, said second predetermined value being at least as great as said first predetermined value, whereby said quick service limiting valve is maintained in said actuated position;
   (c) a second exhaust passage; and
   (d) said valve means further connecting said secondary quick service volume to said second exhaust passage in said release position of said service piston.

3. A brake control valve device as recited in claim 2, wherein said preliminary quick service volume is permanently vented to atmosphere.

4. A brake control valve device as recited in claim 1, further comprising:
   (a) a first exhaust passage via which said supply passage is vented to atmosphere in said release position of said service valve to release fluid under pressure from said brake cylinder device;
   (b) retainer valve means in said exhaust passage for preventing said brake cylinder fluid under pressure from exhausting to a value less than a second predetermined value, said second predetermined value being at least as great as said first predetermined value, whereby said quick service limiting valve is maintained in said actuated position; and
   (c) said valve means further connecting said secondary quick service volume to said first exhaust passage in said release position of said service piston.

5. A brake control valve device as recited in claim 4, wherein said preliminary quick service volume is permanently vented to atmosphere.

* * * * *